United States Patent [19]

Muehllehner et al.

[11] Patent Number: 5,798,527
[45] Date of Patent: Aug. 25, 1998

[54] TOMOGRAPHIC EMISSION SCANNER HAVING CURVED ELEMENT DETECTORS

[75] Inventors: Gerd Muehllehner; Michael Geagan, both of Wayne, Pa.

[73] Assignee: UGM Laboratory, Inc., Philadelphia, Pa.

[21] Appl. No.: 734,283

[22] Filed: Oct. 21, 1996

[51] Int. Cl.$^6$ .............................. G01T 1/161; G01T 1/202
[52] U.S. Cl. .................... 250/363.03; 250/366; 250/367
[58] Field of Search ..................... 250/363.03, 363.04, 250/363.02, 367, 366

[56] References Cited

U.S. PATENT DOCUMENTS

| | | | |
|---|---|---|---|
| 4,095,107 | 6/1978 | Genna et al. | |
| 4,563,582 | 1/1986 | Mullani | 250/367 |
| 4,584,478 | 4/1986 | Genna et al. | 250/363.04 |
| 5,021,667 | 6/1991 | Genna et al. | 250/363.04 X |
| 5,032,728 | 7/1991 | Chang et al. | 250/363.04 |
| 5,448,073 | 9/1995 | Jeanguillaume | 250/363.02 |
| 5,585,637 | 12/1996 | Bertelsen et al. | 250/363.03 |

FOREIGN PATENT DOCUMENTS

| | | | |
|---|---|---|---|
| 5-100035 | 4/1993 | Japan | 250/367 |

*Primary Examiner*—Edward J. Glick
*Attorney, Agent, or Firm*—Panitch Schwarze Jacobs & Nadel, P.C.

[57] ABSTRACT

In the present invention, a tomographic emission scanner has a detection chamber with an axial center line and an axial periphery, and a plurality of single element emission detector units are positioned around the axial periphery of the detection chamber. Each detector unit includes a single detecting element having a detection face oriented toward the detection chamber. The detection face of each detecting element is curved along the axial periphery of the detection chamber.

10 Claims, 2 Drawing Sheets

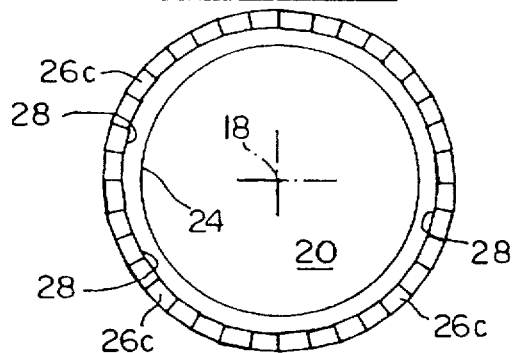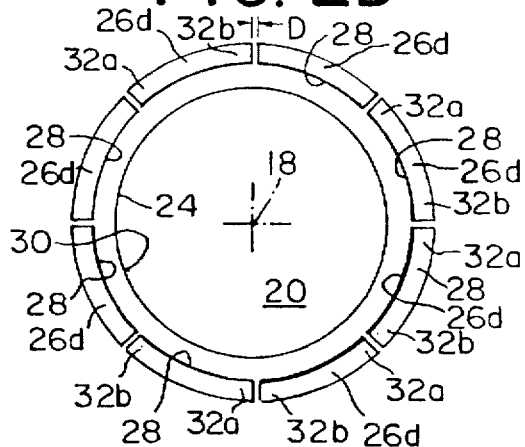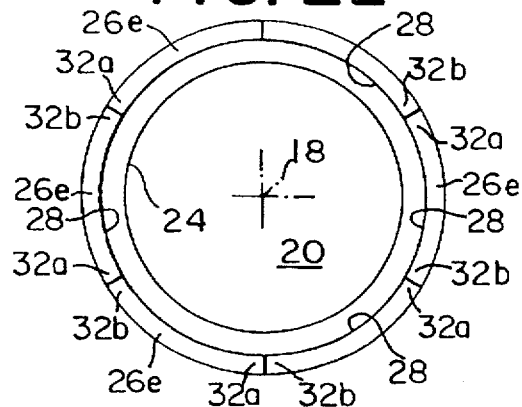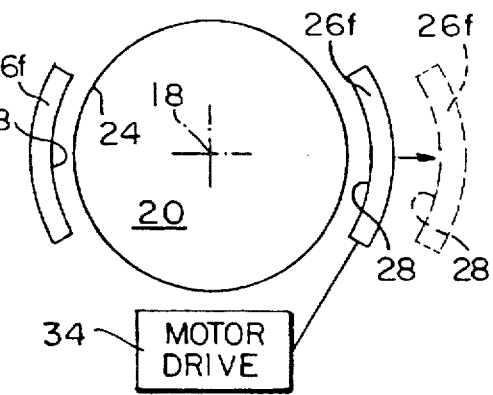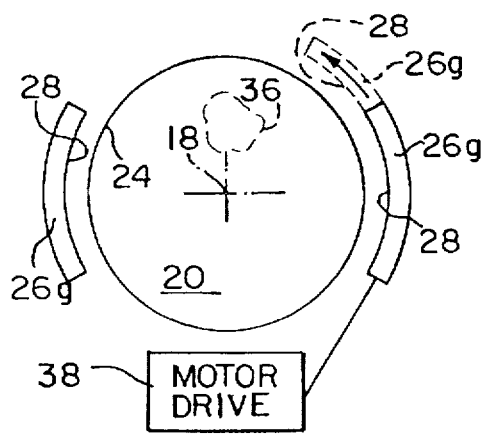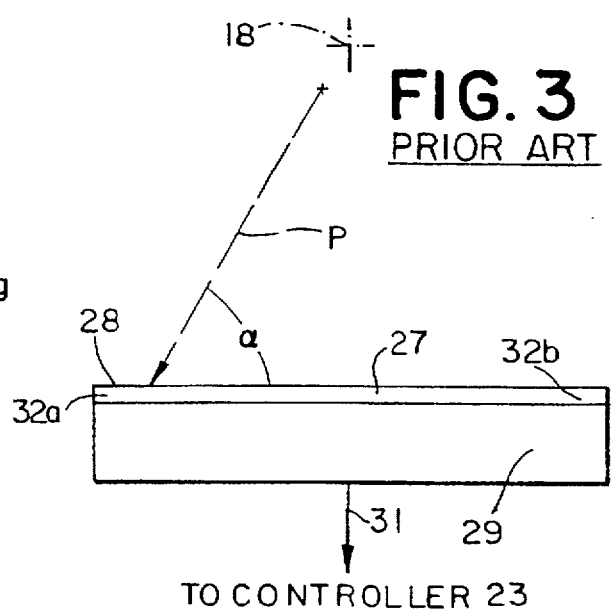

TOMOGRAPHIC EMISSION SCANNER HAVING CURVED ELEMENT DETECTORS

FIELD OF THE INVENTION

The present invention relates generally to a tomographic emission scanner having a plurality of curved element detectors. More particularly, the present invention relates to a positron-emission tomography (PET) scanner wherein each curved element detector has a single detecting element.

BACKGROUND OF THE INVENTION

As is known, tomography is a radiographic technique for imaging a section of a body. Accordingly, a predetermined plane of the body may be shown in detail. Forms of tomography include computerized axial tomography (CAT), magnetic resonance imaging (MRI) tomography, and positron-emission tomography (PET), among others.

In positron-emission tomography in particular, [$^{18}$F]-fluorodeoxyglucose ($^{18}$F-FDG) is commonly introduced into at least a part of the body, and positron emissions from the $^{18}$F-FDG within the body are detected to form the planar sections. More specifically, each emitted positron travels a short distance, combines with an electron, and is annihilated. The resulting energy is carried by two photons with an energy of 511 keV, each of which travels in nearly opposite directions. Accordingly, simultaneous detection (i.e., coincidence detection) of the two photons signals the decay of a positron anywhere along a line connecting the two points of detection. Typically, crystal detectors are employed to detect the photons. A more detailed discussion of positron-emission tomography is set forth in *Progress in Medical Imaging*, Vernon L. Newhouse, Ed., Ch. 4: Positron-Emission Tomography, Joel S. Karp and Gerd Muehllehner, Springer-Verlag, New York, 1988, hereby incorporated by reference.

Typically, PET scanners have a relatively small number of emission detector units positioned around the axial periphery of a detection chamber to detect the photons. Each detector unit includes a detection face oriented toward the detection chamber. In prior art PET scanners, each detection face is constructed to be flat. However, it will be appreciated that a flat-faced detector unit has relatively poor spatial resolution and also suffers from other known problems including end-effect related problems.

In an attempt to alleviate such flat-faced detector problems, it is known that the relatively small number of detector units may be replaced by a single cylindrical detector unit having a continuous cylindrical detection face. However, such a cylindrical detector unit is relatively costly.

Accordingly, it is also known that the single cylindrical detector unit may be replaced by a relatively large number of detector units, each having a flat detection face, such that the relatively large number of flat detection faces approximate the continuous cylindrical detection face of the single cylindrical detector unit. However, the relatively large number of detector units are relatively difficult to monitor and control, and the end-effect problems are intensified by the greater number of edges. A need exists, then, for a PET scanner having detector units that provide good spatial resolution and that alleviate other known problems including end-effect related problems.

SUMMARY OF THE INVENTION

The aforementioned need is satisfied by a tomographic emission scanner having curved element detectors. More particularly, in the present invention, a tomographic emission scanner has a detection chamber with an axial center line and an axial periphery, and a plurality of single element emission detector units are positioned around the axial periphery of the detection chamber. Each detector unit includes a single detecting element having a detection face oriented toward the detection chamber. The detection face of each detecting element is curved along the axial periphery of the detection chamber.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIGS. 2A–2C are cross-sectional views of prior art PET scanner apparati, and show various arrangements of detector units in accordance with the prior art;

FIGS. 2D–2G are cross-sectional views of the apparatus taken along line 2—2 of FIG. 1, and show various arrangements of detector units in accordance with preferred embodiments of the present invention; and FIG. 3 is a more detailed cross-sectional view of one of the prior art detector units shown in FIG. 2A.

DETAILED DESCRIPTION OF PREFERRED EMBODIMENTS

Figure 1:
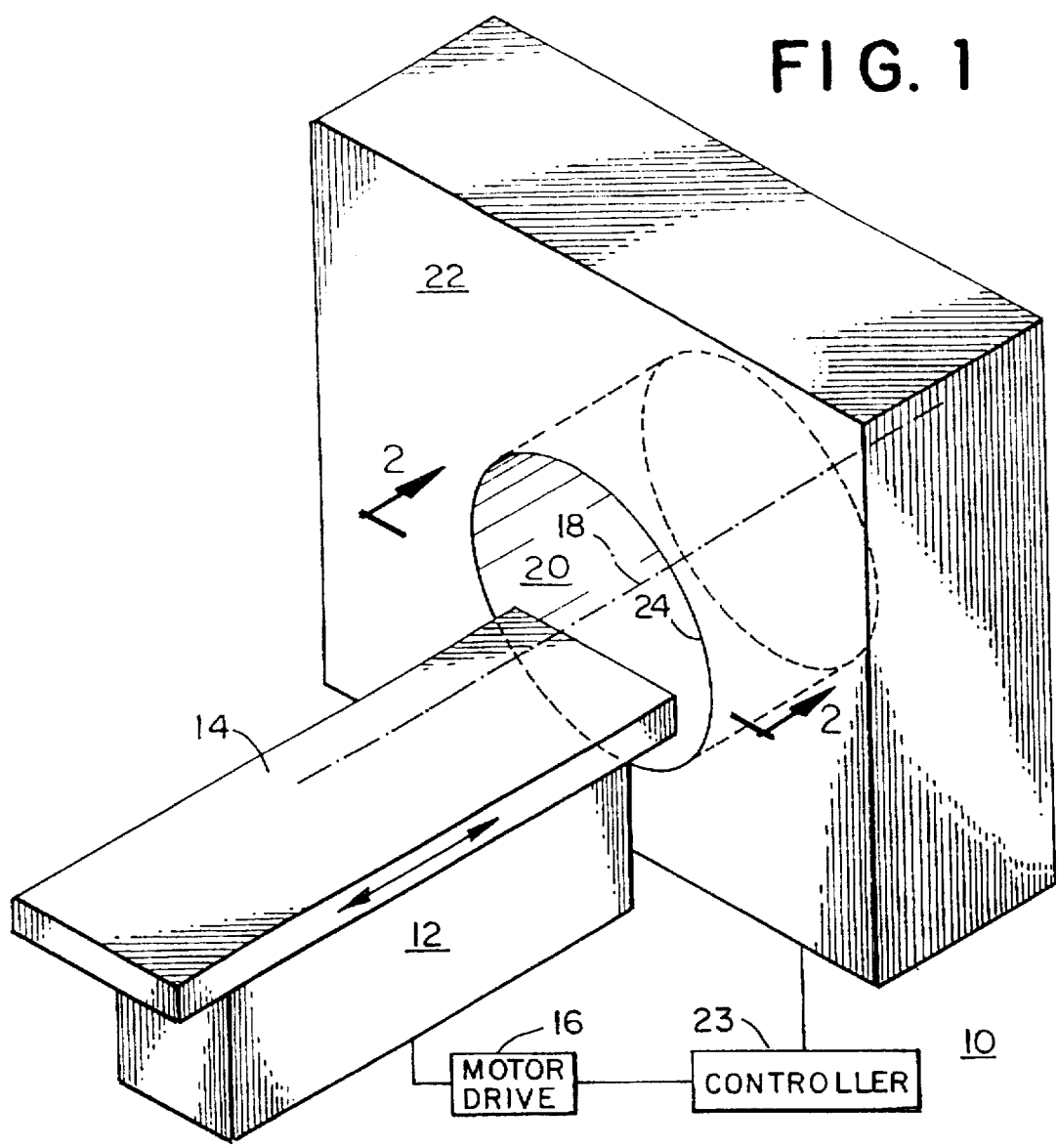
FIG. 1 is a perspective view of a positron-emission tomographic (PET) scanner apparatus in accordance with the present invention.

Certain terminology may be used in the following description for convenience only and is not limiting. The words "left", "right", "upper" and "lower" designate directions in the drawings to which reference is made. The words "inwardly" and "outwardly" are further directions toward and away from, respectively, the geometric center of a referenced object. The terminology includes the words above specifically mentioned, derivatives thereof, and words of similar import.

Referring to the drawings in detail, wherein like numerals are used to indicate like elements throughout, there is shown in FIG. 1 a positron-emission tomography (PET) scanner apparatus 10 in accordance with a preferred embodiment of the present invention. As seen, the apparatus 10 includes a patient support table or bed 12 upon which a patient (not shown) typically rests during a PET scanning procedure. As should be understood, the patient bed 12 includes a longitudinally extending patient support surface 14 which is movable by a motor drive 16 along an axial line 18. Preferably, the apparatus 10 includes a controller 23 for controlling the operation of the motor drive 16.

The apparatus 10 also includes a detection gantry 22 and a detection chamber 20 formed within the detection gantry 22. As seen, the detection chamber 20 has an inner axial periphery 24 defined by the detection gantry 22. Preferably, the axial line 18 along which the patient support surface 14 moves is the axial center line 18 of the detection chamber 20. Preferably, at least a portion of a patient resting on the patient support surface 14 is moved into the detection chamber 20 during a PET scanning procedure. Preferably, the axial center line 18, the detection chamber 20, and the patient support surface 14 are generally horizontally oriented, although one skilled in the art will appreciate that the axial center line 18, the detection chamber 20, and the patient support surface 14 may be oriented in other positions without departing from the spirit and scope of the present invention.

Figure 2A:
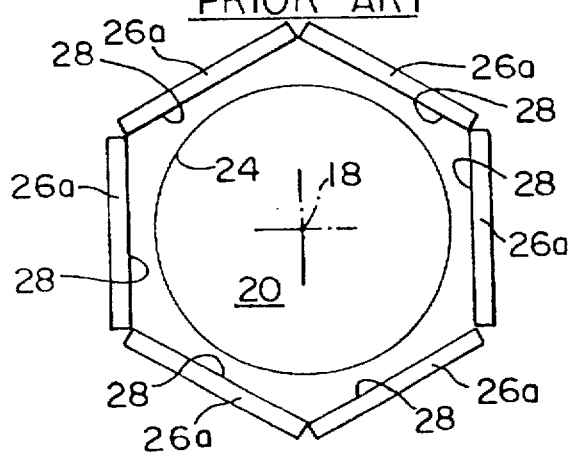

As is known from the prior art, and referring now to FIG. 2A, within the detection gantry 22 may be a relatively small number of emission detector units 26 (26a in FIG. 2A) positioned around the axial periphery 24 of the detection chamber 20. As shown in FIG. 2A, the number of detector units 26a is six, the detector units 26a generally form a hexagon when viewed in axial cross-section, and each detector unit 26a occupies about 60 degrees of arc around the axial periphery 24 of the detection chamber 20.

As should be understood, and referring now to FIG. 3, each detector unit 26 generally includes at least one detecting crystal 27 having a detection surface or face 28 oriented toward the detection chamber 20. Each detection face 28 includes first and second opposing circumferential edges 32a, 32b, where each edge 32a, 32b is substantially parallel to the axial center line 18 of the detection chamber 20. When a photon from within the detection chamber 20 enters the detecting crystal 27 at a particular region, the detecting crystal 27 becomes excited in such region.

Each detector unit 26 also includes sensing circuitry 29 adjacent the detecting crystal 27 for sensing such photon excitation and for producing an appropriate electrical signal 31 based on the sensed photon. Preferably, the controller 23 that controls the operation of the motor drive 16 (FIG. 1) also controls the operation of the detection gantry 22 and each detector unit 26 including the sensing circuitry 29, and the controller 23 receives the electrical signals 31 from the sensing circuitry 29.

Preferably, the electrical signals 31 from all the detector units 26 are forwarded to the controller 23 and are employed to produce one or more planar images of a portion of the patient. The sensing circuitry 29, the controller 23, and the methodology for producing the planar images are generally known to one having ordinary skill in the applicable art, are therefore not considered to form a part of the present invention, and are also therefore not further discussed in the present disclosure.

Referring again to FIG. 2A, each prior art detector unit 26a includes a single detecting crystal 27 (shown in FIG. 3) having a generally flat detection face 28. As one skilled in the art will appreciate, though, a flat-faced detecting crystal 27 has relatively poor spatial resolution. In particular, and as seen in FIG. 3, when a particular photon originates from within the detection chamber 20 adjacent the axial center line 18 thereof and enters the detecting crystal 27 of the detector unit 26 along a photon path (P) at a relatively steep angle ($\alpha$) toward one of the circumferential edges 32a, 32b, such angle ($\alpha$) hampers the ability of the detecting crystal 27 and the sensing circuitry 29 to accurately locate the entry point based on the excitation sensed in connection with the entry. Further, such a flat-faced detecting crystal 27 also suffers from other known end-effect related problems.

Figure 2B:
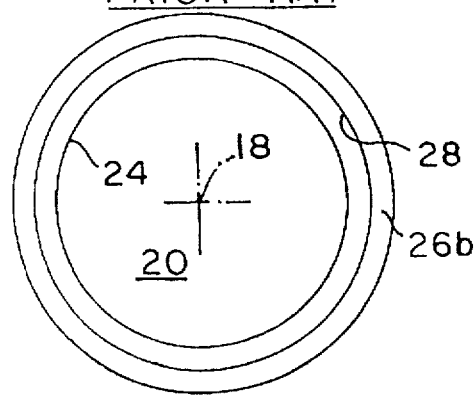

In an attempt to alleviate the problems caused by flat-faced detecting crystal 27, and referring now to FIG. 2B, it is known that the multiple detector units 26a of FIG. 2A may be replaced by a single generally cylindrical detector unit 26b having a continuous cylindrical detection face 28 oriented toward the detection chamber 20. However, and as one skilled in the art will readily appreciate, the cost of forming a single detecting crystal 27 of the detector unit 26b is prohibitive, especially if the detection chamber 20 must be large enough to accommodate the entire body of an average-size adult patient. Moreover, and as should also be readily appreciated, if the single detector unit 26b fails and must be replaced, the cost of such replacement is certainly more than the cost of replacing one of the plurality of detector units 26a.

In another prior art embodiment of the apparatus 10, and as shown in FIG. 2C, a relatively large number of detector units 26c are positioned around the axial periphery 24 of the detection chamber 20, where each detector unit 26c has a detection face 28 oriented toward the detection chamber 20, and where each detection face 28 is generally flat. As shown in FIG. 2C, the number of detector units 26c is thirty-six, and each detector unit 26c occupies about 10 degrees of arc around the axial periphery 24 of the detection chamber 20. Accordingly, the plurality of generally flat detection faces 28 of the detector units 26c approximate the generally curved detection face 28 of the detector unit 26b.

However, such an arrangement is more complex and therefore has been found to be more difficult and more expensive to manufacture. Moreover, although the problem of steep angle photon entry (as was described in connection with the detector units 26a of FIG. 2A and 3) has been reduced, such problem still exists, and the end-effect problem (as was mentioned in connection with the detector units 26a of FIG. 2A and 3) still remains in the detector units 26c and is intensified by the greater number of edges 32a, 32b.

In a preferred embodiment of the present invention, and referring now to FIG. 2D, the problems associated with flat-faced detecting crystals 27 are alleviated by employing detector units 26d in a coincidence detection scanner, where each detector unit 26d includes a single detecting crystal 27 or other single element detecting device (hereinafter "crystal") having a detection face 28 oriented toward the detection chamber 20, and where the detection face 28 is curved along the axial periphery 24 of the detection chamber 20. As shown in FIG. 2D, the number of detector units 26d is eight, the detector units 26d generally form a circle when viewed in axial cross-section, and each detector unit 26d occupies about 45 degrees of arc around the axial periphery 24 of the detection chamber 20.

Accordingly, any photon originating adjacent the axial center line 18 of the detection chamber 20 that enters the detecting crystal 27 of one of the detector units 26 does so generally head on and not at an angle, even adjacent the edges 32a, 32b. Moreover, although end-effect problems still remain with a curved-face detecting crystal 27, such end-effect problems are mitigated by such curvature and the relatively small number of edges 32a, 32b.

The embodiment shown in FIG. 2E differs from the embodiment shown in FIG. 2D in that the number of detector units 26d is six, and each detector unit 26d occupies about 60 degrees of arc around the axial periphery 24 of the detection chamber 20. However, and as with the detector units 26d, the detector units 26e have generally curved detection faces 28 and generally form a circle when viewed in axial cross-section. As one skilled in the art will appreciate, at least one pair of opposingly situated detector units 26 are required in the present invention (as seen in FIGS. 2F and 2G). Preferably, two to eight detector units 26 are employed in any embodiment of the present invention.

As shown in FIG. 2D, the first edge 32a of each detection face 28 in the present invention may be spaced from the second edge 32b of an immediately adjacent detection face 28 by a predetermined distance D. Alternatively, and as shown in FIG. 2E, the first edge 32a of each detection face 28 may border or even engage the second edge 32b of an immediately adjacent detection face 28. Accordingly, the detection faces 28 of the detector units 26e may contact one another or be separated from one another.

In another preferred embodiment of the present invention, and referring now to FIG. 2F, the detector units 26f are positioned to form substantial arcual gaps therebetween, where each detector unit 26f has a generally curved detection face 28. As seen in FIG. 2F, two generally opposingly situated detector units 26f are employed, where each detector unit 26f occupies about 60 degrees of arc around the axial periphery 24 of the detection chamber 20. However, one skilled in the art will recognize that each detector unit 26f may have another angular arc without departing from the spirit and scope of the present invention. One skilled in the art will also recognize that other numbers of detector units 26f may be employed without departing from the spirit and scope of the present invention.

As should be appreciated, then, the detection faces 28 of the detector units 26 need not necessarily substantially completely enclose the axial periphery 24 of the detection chamber 20, as is the case in FIGS. 2D and 2E. Although photons that originate from within the detection chamber 20 may not always be detected because of such incomplete enclosure, it will be appreciated that enough such photons are detected assuming that an adequate amount of photons are emitted and that the detection face 28 of each detector unit 26f covers a wide-enough arcual portion around the detection chamber 20. Preferably, enough $^{18}$F-FDG is employed in any embodiment of the present invention to cause an adequate amount of the photons to be emitted. However, one skilled in the art will recognize that other appropriate photon-causing substances may be employed without departing from the spirit and scope of the present invention.

Preferably, at least one of the detector units 26f is radially movable from a first position (shown in solid in FIG. 2F) through several intermediate positions to a second position (shown in phantom in FIG. 2F) by way of an appropriately configured motor drive 34. As may be appreciated, by radially moving the at least one detector unit 26f, the apparatus 10 may accommodate different-size bodies (i.e., adult, child, infant, baby, etc.).

The embodiment shown in FIG. 2G differs from the embodiment shown in FIG. 2F in that at least one of the detector units 26g is circumferentially movable from a first position (shown in solid in FIG. 2G) through several intermediate positions to a second position (shown in phantom in FIG. 2G) by way of an appropriately configured motor drive 38. As may be appreciated, and similar to the radial movement of the at least one detector unit 26f, the circumferential movement of the at least one detector unit 26g, allows the apparatus 10 to be focused on different generally axially extending portions 36 within the detection chamber 20.

Preferably, in any of the embodiments of the present invention, the detection chamber 20 is substantially cylindrical and the detection face 28 of each detecting crystal 27 is curved along a portion of a cylindrical wall 30 of the detection chamber 20. However, one skilled in the art will recognize that the detection chamber 20 may have other shapes while still being within the spirit and scope of the present invention. For example, the detection chamber 20 may be substantially oval in a cross-section taken along line 2—2 on FIG. 1, as well as other appropriate shapes.

Preferably, in any of the embodiments of the present invention, each detector unit 26 is a positron-emission detector unit. As one skilled in the art will appreciate, the detecting crystal 27 at the detection face 28 of a positron-emission detector unit 26 is especially attuned to sensing positron-emitted photons entering the detecting crystal 27. Preferably, each positron-emission detector unit 26 includes an NaI(Tl) scintillation crystal, although other similar crystals (such as BGO, for example) and other detecting elements may be employed without departing from the spirit and scope of the present invention.

From the foregoing description, it can be seen that the present invention comprises a new and useful apparatus for coincidence detecting positron-emissions in a PET scanner. However, it will be appreciated by those skilled in the art that the arrangements shown in the accompanying drawings and described above, if appropriately configured, may also be employed with other types of scanners without departing from the spirit and scope of the present invention. Moreover, it will be appreciated by those skilled in the art that changes can be made to the embodiments described above without departing from the broad inventive concepts thereof. It is understood, therefore, that this invention is not limited to the particular embodiments disclosed but is intended to cover modifications within the spirit and scope of the present invention as defined by the appended claims.

We claim:

1. A positron emission coincidence detection scanner comprising:

a detection chamber having an axial center line and an axial periphery; and a plurality of single element non-collimated positron emission detector units positioned around the axial periphery of the detection chamber, each detector unit including a single detecting element having a detection face oriented toward the detection chamber, the detection face of each detecting element being curved along the axial periphery of the detection chamber.

2. The positron emission coincidence detection scanner of claim 1 wherein each detecting element is a detecting crystal.

3. The positron emission coincidence detection scanner of claim 1 wherein the detection chamber is substantially cylindrical and wherein the detection face of each detecting element is curved along a portion of a cylindrical wall of the detection chamber.

4. The positron emission coincidence detection scanner of claim 1 wherein each detection face includes first and second opposing edges, each edge being substantially parallel to the axial center line of the detection chamber, the first edge of each detection face bordering the second edge of an immediately adjacent detection face.

5. The positron emission coincidence detection scanner of claim 4 wherein the scanner comprises two to eight detector units.

6. The positron emission coincidence detection scanner of claim 1 wherein each detection face includes first and second opposing edges, each edge being substantially parallel to the axial center line of the detection chamber, the first edge of each detection face being spaced from the second edge of an immediately adjacent detection face by a predetermined distance.

7. The positron emission coincidence detection scanner of claim 6 wherein the scanner comprises at least one pair of opposingly situated detector units.

8. The positron emission coincidence detection scanner of claim 6 wherein the scanner comprises two to eight detector units.

9. The positron emission coincidence detection scanner of claim 1 wherein at least one of the detector units is radially movable with respect to the axial center line of the detection chamber.

10. The positron emission coincidence detection scanner of claim 1 wherein at least one of the detector units is circumferentially radially movable with respect to the axial center line of the detection chamber.

* * * * *